United States Patent
Gertzmann et al.

(10) Patent No.: US 7,345,110 B2
(45) Date of Patent: Mar. 18, 2008

(54) PROCESS FOR THE CONTINUOUS PRODUCTION OF AN AQUEOUS POLYURETHANE DISPERSION

(75) Inventors: Rolf Gertzmann, Leverkusen (DE); Bernd Klinksiek, Bergisch Gladbach (DE); Lars Obendorf, Köln (DE); Christoph Irle, Barcelona (ES)

(73) Assignee: Bayer MaterialScience AG, Leverkusen (DE)

( * ) Notice: Subject to any disclaimer, the term of this patent is extended or adjusted under 35 U.S.C. 154(b) by 304 days.

(21) Appl. No.: 11/099,160

(22) Filed: Apr. 5, 2005

(65) Prior Publication Data

US 2005/0234190 A1    Oct. 20, 2005

(30) Foreign Application Priority Data

Apr. 8, 2004    (DE) .................. 10 2004 017 436

(51) Int. Cl.
    C08J 3/00    (2006.01)
    C08K 3/20    (2006.01)
    C08L 75/00   (2006.01)
    B01F 1/00    (2006.01)
    C08F 6/00    (2006.01)

(52) U.S. Cl. .................. 524/591; 428/423.1; 523/318; 523/319; 523/324; 523/353; 524/839; 524/840; 528/502 F

(58) Field of Classification Search ............. 428/423.1; 524/591, 839, 840; 523/318, 319, 324, 353; 528/502 F
See application file for complete search history.

(56) References Cited

U.S. PATENT DOCUMENTS

| | | | |
|---|---|---|---|
| 3,635,870 A | 1/1972 | Thoma et al. | 260/30.8 |
| 3,640,937 A | 2/1972 | Thoma et al. | 260/30.8 |
| 3,658,746 A | 4/1972 | Rosendahl et al | 260/30.8 DS |
| 3,687,952 A | 8/1972 | Ismail | 260/248 CS |
| 4,108,814 A | 8/1978 | Reiff et al. | 260/29.2 TN |
| 4,387,181 A | 6/1983 | Brown et al. | 524/714 |
| 4,801,644 A | 1/1989 | Coogan | 524/839 |
| 4,921,842 A | 5/1990 | Henning et al. | 524/839 |
| 5,037,864 A * | 8/1991 | Anand et al. | 523/348 |
| 5,432,228 A | 7/1995 | Hilken et al. | 524/591 |
| 5,723,518 A | 3/1998 | Kahl et al. | 523/324 |
| 5,959,027 A | 9/1999 | Jakubowski et al. | 524/839 |
| 5,981,653 A | 11/1999 | Wilmes et al. | 524/839 |
| 6,720,385 B2 | 4/2004 | Tabor et al. | 524/591 |
| 2002/0082342 A1 | 6/2002 | Jakubowski et al. | 524/589 |

FOREIGN PATENT DOCUMENTS

CA    2253119    5/1999

* cited by examiner

Primary Examiner—Patrick Niland
(74) Attorney, Agent, or Firm—Noland J. Cheung

(57) ABSTRACT

A process for the continuous production of an aqueous polyurethane dispersion based on at least one aliphatic and/or aromatic polyisocyanate is described, which is characterised by the following steps:
  a) production of an aqueous pre-emulsion by mixing a polyurethane prepolymer containing hydrophilic and/or potentially hydrophilic groups with water in a mixing nozzle, wherein the polyurethane prepolymer is injected into the water;
  b) formation of an emulsion by homogenization of the pre-emulsion from step a) in a multi-step homogenizing nozzle. Paint films containing the aqueous polyurethane dispersion produced by the process can be used to coat substrates.

18 Claims, 6 Drawing Sheets

PROCESS FOR THE CONTINUOUS PRODUCTION OF AN AQUEOUS POLYURETHANE DISPERSION

CROSS REFERENCE TO RELATED PATENT APPLICATION

The present patent application claims the right of priority under 35 U.S.C. §119 (a)-(d) of German Patent Application No. 10 2004 017 436.9, filed Apr. 8, 2004.

BACKGROUND OF THE INVENTION

1. Field of the Invention

The invention relates to a process for the continuous production of aqueous polyurethane dispersions based on aliphatic and/or aromatic polyisocyanates.

2. Description of the Prior Art

From the prior art, essentially two batch processes are known for the industrial-scale production of aqueous polyurethane dispersions: the acetone process and the prepolymer mixing process. The production of dispersions based on aliphatic polyisocyanates is achieved relatively easily with both processes because of the moderate reactivity of the aliphatic polyisocyanates. The production of dispersions based on aromatic polyisocyanates generally takes place by the acetone process or the ketimine process, since both processes prevent excessive foaming in the dispersing step, caused by the isocyanate-water reaction. In WO 81/02894, another route is followed to obtain dispersions based on aromatic polyisocyanates (PIC). The reactive PIC groups are reacted with a blocking agent which can be split off again, so that foaming takes place only to a minor degree or not at all. Disadvantages of this process are—as in the ketimine process—on the one hand the additional blocking step and on the other hand the low molecular-weight blocking agent, which remains in the system or has to be removed in an additional step.

In EP-A 0 220 000, the production of aromatic dispersions by the prepolymer mixing process is described. However, the examples show that an external emulsifier is always required in the production process, which later remains in the coatings produced from the dispersions and brings the disadvantages known to the person skilled in the art. Furthermore, the neutralisation of the prepolymer takes place indirectly, i.e. the tert. amine needed to neutralise the carboxyl groups is added to the initial water. Direct neutralisation here leads to a marked reduction in NCO in the prepolymer, well below the theoretical NCO content. In addition, it is almost impossible to exchange the hydrazine used as a chain-extending amine for other amines that are reactive towards isocyanates. Finally, the dispersions obtained according to EP-A 0 220 000 possess a solids content of only 30 wt. %.

For the continuous production of aqueous polyurethane dispersions, a process is known from WO 98/41552, for example. In this process, dispersions are produced using mechanically driven dispersers, which are thus prone to breakdowns, and generally with the addition of external emulsifiers.

EP-A 0 303 907 also describes a continuous process in which aqueous polyurethane dispersions are produced. The preferred process provides for the metering of water into the higher-viscosity prepolymer at high speed, the inhomogeneous mixture being homogenised or the (pre)polymer dispersed in a mixing tube. A disadvantage of this process, which is very advantageous per se, is the increasingly deteriorating service life of the system when high-viscosity prepolymers are processed.

The object of the present invention is to provide a process for the continuous production of aqueous, aliphatic and aromatic polyurethane dispersions, which lacks the above-mentioned disadvantages. In particular, the process should also make it possible to produce polyurethane dispersions based on aromatic polyisocyanates, as well as to process high-viscosity prepolymers. Furthermore, the process should be distinguished by a high service life of the order of magnitude of 10 hours and more.

SUMMARY OF THE INVENTION

The present invention provides a process for the continuous production of an aqueous polyurethane dispersion based on at least one aliphatic and/or aromatic polyisocyanate, including the steps of:

a) producing an aqueous pre-emulsion by mixing a polyurethane prepolymer containing hydrophilic and/or potentially hydrophilic groups with water in a mixing nozzle, wherein the polyurethane prepolymer is injected into the water; and b) forming an emulsion by homogenizing the pre-emulsion from step a) in a multi-step homogenising nozzle.

The present invention also is directed to substrates coated with a paint film that contains an aqueous polyurethane dispersion produced according to the above-described process.

DETAILED DESCRIPTION OF THE INVENTION

Figure 1:
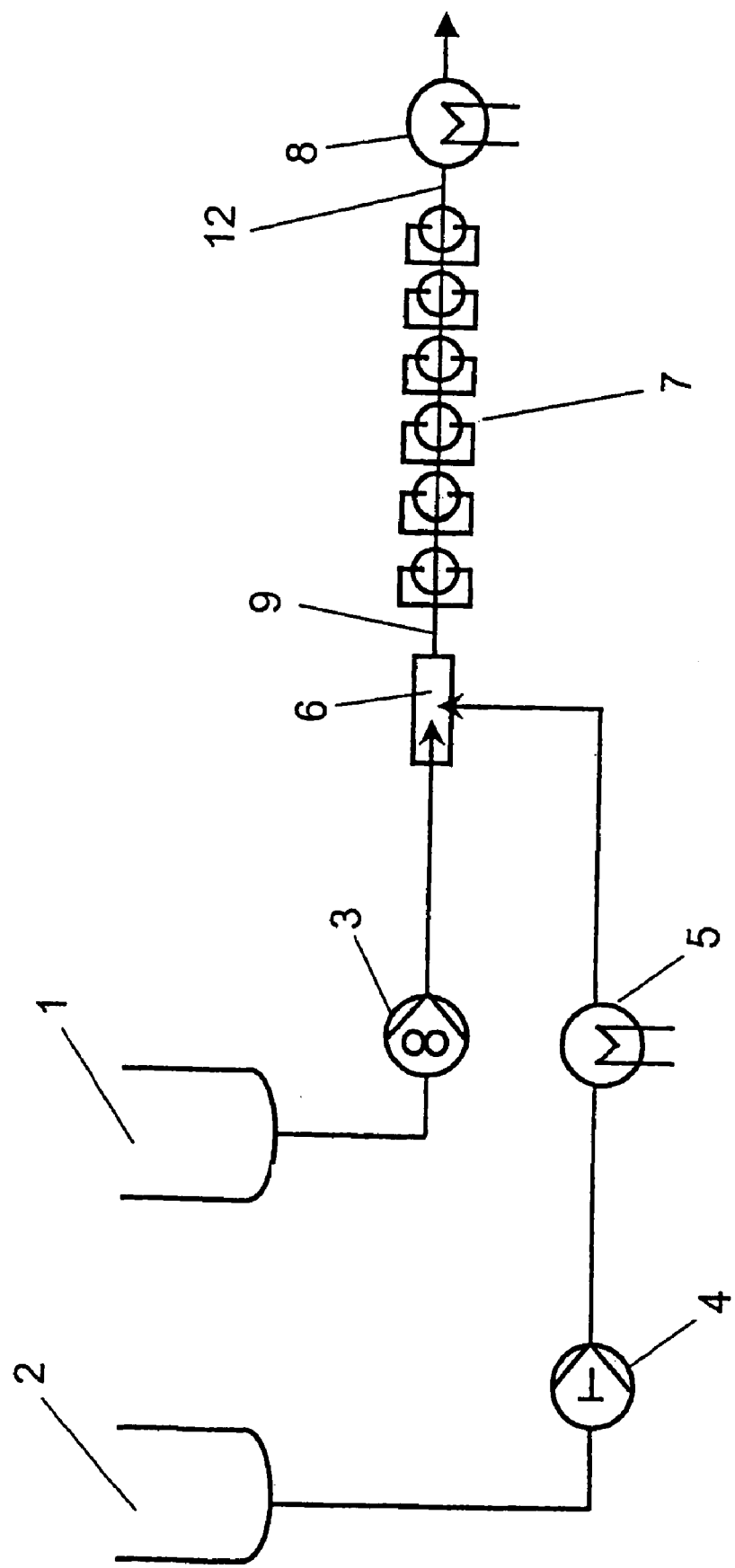
FIG. 1 shows a flow diagram of a process according to the invention for the dispersing of aliphatic prepolymers with batchwise chain lengthening.

Other than in the operating examples, or where otherwise indicated, all numbers or expressions referring to quantities of ingredients, reaction conditions, etc. used in the specification and claims are to be understood as modified in all instances by the term "about."

The invention provides a process for the continuous production of an aqueous polyurethane dispersion, based on at least one aliphatic and/or aromatic polyisocyanate, characterised by the following steps:

a) production of an aqueous pre-emulsion by mixing a polyurethane prepolymer containing hydrophilic and/or potentially hydrophilic groups with water in a mixing nozzle, wherein the polyurethane prepolymer is injected into the water;

b) formation of an emulsion by homogenisation of the pre-emulsion from step a) in a multi-step homogenising nozzle.

Starting products for the process according to the invention for the continuous production of aqueous polyurethane dispersions are polyurethane prepolymers. The production of solvent-containing or solvent-free polyurethane prepolymers, as are suitable for the process according to the invention, takes place by a process known from the prior art. Various processes are described fully in the prior art.

The process described in EP-A 0 304 718 can be mentioned as an example. However, the production of a polyurethane prepolymer is not limited to the process described in EP-A 0 304 718.

For the production of the prepolymers, a molar excess of diisocyanate is often initially charged into the reactor and then the diols and polyols containing active hydrogen atoms are added in the presence or absence of solvents. In the polyol mixture, which generally consists of higher molecular weight (400 to 6000 g/mol) and lower molecular weight diols, triols or polyols (62 to 400 g/mol), there are also hydrophilic, ionic and/or non-ionic and/or hydrophilisable compounds containing groups that are reactive towards isocyanate groups. These ensure the dispersibility of the polymer. The reaction is generally conducted at temperatures of 40 to 120° C. until a constant NCO content is reached. To accelerate the NCO-OH reaction, the catalysts conventional in polyurethane chemistry can also be employed. The conversion of the potentially hydrophilic groups into hydrophilic groups causing dispersibility in water generally takes place by adding suitable compounds (e.g. bases in the case of carboxylic acid-functional prepolymers, or acids or components causing quaternisation in the case of prepolymers containing tertiary amino groups), before or after the NCO content has been established.

The conversion of the hydrophilisable component to the hydrophilic form, e.g. using a neutralising amine, can take place both in the reaction vessel for the production of the prepolymer and online during the continuous process according to the invention. If this step takes place online, it can take place either before the prepolymer is mixed with water or during the production of the pre-emulsion according to step a) of the process according to the invention, by adding to the water (also referred to as dispersing water) a sufficient quantity of the group bringing about conversion to the ionic form.

The prepolymer is preferably reacted continuously in a mixing nozzle with at least one component bringing about the conversion of the potentially ionic groups to the ionic form before the production of the aqueous pre-emulsion according to step a).

Either aliphatic or aromatic polyisocyanates or mixtures of aliphatic and aromatic polyisocyanates can be employed in the process according to the invention.

As aliphatic polyisocyanates for the production of the polyurethane prepolymer, diisocyanates of the formula $R^1(NCO)_2$ are preferably used, wherein $R^1$ denotes an aliphatic hydrocarbon residue with 4 to 12 carbon atoms or a cycloaliphatic hydrocarbon residue with 6 to 15 carbon atoms or an araliphatic hydrocarbon residue with 7 to 15 carbon atoms. Examples of these preferred diisocyanates are tetramethylene diisocyanate, hexamethylene diisocyanate, α,α,α',α'-tetramethyl-m- or p-xylylene diisocyanate; 1-isocyanato-3,3,5-trimethyl-5-isocyanatomethyl-cyclohexane (isophorone diisocyanate) and 4,4'-diisocyanatodicyclohexylmethane as well as mixtures of the above-mentioned diisocyanates.

As aromatic polyisocyanates for the prepolymer production, diisocyanates of the formula $R^2(NCO)_2$ are used, wherein $R^2$ denotes an aromatic hydrocarbon residue with 6 to 15 carbon atoms. Examples of these preferred diisocyanates are 4,4'-diisocyanatodiphenylmethane, 2,4'-diisocyanatodiphenylmethane, 2,4-diisocyanatotoluene, 2,6-diisocyanatotoluene or mixtures of these diisocyanates.

As higher molecular-weight polyols with a molecular weight of 400 to 6000, the components conventionally employed for the production of polyurethanes are used. They have an OH functionality of 1.8 to 5, preferably of 1.9 to 3 and particularly preferably of 1.93 to 2.0. They are, for example, polyesters, polyethers, polycarbonates, polyester carbonates, polyacetals, polyolefins, polyacrylates and polysiloxanes. α,ω-Diols of polyesters, polyethers based on propylene oxide or tetrahydrofuran, polyester carbonates and polycarbonates are preferably used.

Suitable short-chain diols and polyols are those with molecular weights of less than 400. The diols conventional in polyurethane chemistry are used as diols, such as e.g. ethylene glycol, 1,2- and 1,3-propanediol, 1,3- and 1,4-butanediol, 1,6-hexanediol, 2-ethyl-1,3-hexanediol, diethylene glycol, dipropylene glycol, neopentyl glycol, 2,4-dimethylpentanediol, 2-ethyl-3-propyl-1,5-pentanediol, 2,2,4-trimethylpentanediol, cyclohexanedimethanol or mixtures of such diols. Short-chain polyols, such as e.g. trimethylolpropane, glycerol, hexanetriol, pentaerythritol and N,N',N"-tris(2-hydroxyethyl) isocyanurate can optionally also be added in quantities such that the prepolymer remains stirrable.

Suitable ionic or potentially ionic compounds and non-ionic compounds are those having at least one group that is reactive towards NCO groups. Suitable compounds are e.g. mono- and dihydroxycarboxylic acids, mono- and diaminocarboxylic acids, mono- and dihydroxysulfonic acids, mono- and diaminosulfonic acids and mono- and dihydroxyphosphonic acids or mono- and diaminophosphonic acids and their salts, such as e.g. dimethylolpropionic acid or dimethylolbutanoic acid, hydroxypivalic acid, N-(2-aminoethyl)-β-alanine, 2-(2-aminoethylamino)ethanesulfonic acid, ethylenediamine propyl- or ethylenediamine butylsulfonic acid, 1,2- or 1,3-propylenediamine-β-ethylsulfonic acid, lysine or 3,5-diaminobenzoic acid. Also suitable are the hydrophilising agent according to Example 1 of EP-A-0 916 647 and the alkali and/or ammonium salts thereof, the adduct of sodium bisulfite to butene-2-diol-1,4, polyether sulfonate, the propoxylated adduct of 2-butenediol and $NaHSO_3$ (e.g. in DE-A 24 46 440, pages 5-9, formulae I-III) and building blocks that can be converted to cationic groups, such as N-methyldiethanolamine.

Non-ionic hydrophilic compounds, e.g. polyoxyalkylene ethers with at least one hydroxy or amino group, can be used as a proportion of a hydrophilising component or individually as a hydrophilising component. These polyethers contain a proportion of 30 wt. % to 100 wt. % of building blocks derived from ethylene oxide.

Prepolymers exhibiting potentially ionic groups are converted to the ionic form before the production of the pre-emulsion according to step a) by reaction with a suitable component. Prepolymers with carboxylic acid or sulfonic acid groups are converted to ionic, water-soluble groups by adding basic compounds. Amino groups are converted to ionic, water-soluble groups by protonation/quaternisation.

If the prepolymer has a sufficient quantity of polyethylene oxide chains or sulfonate groups, a resin that can be dispersed without any other additions may possibly be formed if there is no co-hydrophilisation with the above-mentioned components.

The acid groups are neutralised with tertiary amines that are inert with respect to isocyanate groups, which can leave the film completely or partially during subsequent curing. Examples of these compounds are ammonia, ammonium carbonate or hydrogen carbonate, trimethylamine, triethylamine, tributylamine, diisopropylethylamine. Less preferably, those amines containing groups that are reactive towards isocyanates, such as e.g. dimethylethanolamine, diethyl-ethanolamine, triethanolamine, which no longer leave the film on binding to the polymer matrix, can also be used. In addition, alkali and alkaline earth hydroxides or corresponding carbonates are also, less preferably, suitable.

In the case of cationic groups, dimethyl sulfate, phosphoric acid or succinic acid are used. In addition, quaternising agents, such as e.g. 1,4-dichlorobutene, can also be used. The conversion of the potentially ionic groups to the ionic form is preferably performed in a mixing nozzle, but it can also take place in bulk in the case of NCO prepolymers based on aliphatic polyisocyanates.

The production of the aqueous pre-emulsion according to step a) takes place in a mixing nozzle. Examples of mixing nozzles that can be used are smooth-jet nozzles, fan-spray nozzles, annular nozzles, ring-shaped nozzles, perforated nozzles or counter-jet nozzles. A mixing nozzle that works in a similar way to the pre-emulsifying in the jet disperser known from DE 195 10 651 A is preferably used. The prepolymer feed is optionally temperature-controlled.

The production of the pre-emulsion according to step a) using a mixing nozzle takes place with a pressure difference of 0.1 to 100 bar, preferably 0.2 to 50 bar, particularly preferably 0.5 to 20 bar.

For the production of the aqueous pre-emulsion according to step a), sufficient water is added for an oil in water emulsion to form. The ratio of polyurethane prepolymer to water is preferably 70:30 to 20:80 parts by weight, preferably 66:34 to 30:70 parts by weight and particularly preferably 50:50 to 35:65 parts by weight.

According to the invention, the polyurethane prepolymer is injected into the water according to step a). This has the advantage of increased service life periods compared with the opposite method, in which the water is injected into the polyurethane prepolymer.

In a preferred embodiment of the process, the temperature of the prepolymer is 10° C. to 100° C., preferably 15° C. to 80° C. and particularly preferably 20° C. to 70° C. The temperature of the dispersing water is 5° C. to 95° C., preferably 10° C. to 85° C. and particularly preferably 20° C. to 60° C. The processing temperature of the prepolymer determines the viscosity of the resin, which is 500 to 100,000 mPa•s, preferably 1,000 to 70,000 mPa•s and particularly preferably 2,000 to 40,000 mPa•s.

According to step b) of the process according to the invention, an emulsion is produced by homogenising the pre-emulsion from a). The homogenisation is performed in a multi-step homogenising nozzle. Two to 20 steps are preferably used, particularly preferably 3 to 15 steps. Examples of homogenising nozzles that can be used are flat nozzles, notched nozzles, knife-edge nozzles or counter-jet dispersers. A jet disperser is preferably used as the homogenising nozzle. The jet disperser known from DE 195 10 651 A, for example, can be used as jet disperser.

The production of the emulsion from the pre-emulsion by homogenisation according to step b) using a multi-step homogenising nozzle takes place with a pressure difference of 1 to 200 bar, preferably 3 to 100 bar, particularly preferably 5 to 60 bar, the pressure difference referring to the total of all steps of the multi-step homogenising nozzle.

In a preferred embodiment of the process according to the invention, in a further step c) the emulsion produced according to b), containing NCO groups, is at least partially reacted with at least one amine that is reactive towards isocyanate groups. The quantity of amine here is such that a degree of chain lengthening of 40 to 125%, preferably 50 to 100% and particularly preferably 60 to 90% results.

Suitable amines for this purpose are: mono-, di-, tri- and/or tetraaminofunctional substances, as well as amino alcohols in a molecular weight range of up to 400, such as e.g. ethylenediamine, 1,2- and 1,3-diaminopropane, 1,3-, 1,4- and 1,6-diaminohexane, 1,3-diamino-2,2-dimethylpropane, 1-amino-3,3,5-trimethyl-5-aminoethylcyclohexane (IPDA), 4,4'-diaminodicyclohexylmethane, 2,4- and 2,6-diamino-1-methylcyclohexane, 4,4'-diamino-3,3'-dimethyl-dicyclohexylmethane, 1,4-bis(2-aminoprop-2-yl)-cyclohexane, polyamines; such as ethylenediamine, 1,2- and 1,3-diaminopropane, 1,4-diaminobutane, 1,6-diaminohexane, isophorone diamine, mixture of isomers of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and 1,4-xylylenediamine and 4,4-diaminodicyclohexylmethane, aminoethanol, diethanolamine or mixtures of these compounds. Hydrazine, hydrazine hydrate and substituted hydrazines, such as e.g. N-methylhydrazine, N,N'-dimethylhydrazine and the homologues thereof, as well as acid dihydrazides of adipic acid, β-methyladipic acid, sebacic acid, hydracrylic acid and terephthalic acid, semicarbazidoalkylene hydrazides, such as e.g. β-semicarbazidopropionic acid hydrazide (e.g. DE-A 17 70 591), semicarbazidoalkylene carbazic esters, such as e.g. 2-semicarbazidoethyl carbazic ester (e.g. DE-A 19 18 504) or aminosemicarbazide compounds, such as e.g. β-aminoethylsemicarbazido carbonate (e.g. DE-A 19 02 931), are also suitable as diamines within the meaning of the invention. The proportional use of monofunctional amines having no other groups that are reactive towards NCO groups, such as e.g. butylamine and higher homologues, is also possible.

In another embodiment, however, the addition of a chain extender can also be omitted, so that the chain lengthening is caused exclusively by water.

The reaction with the amine according to step c) can take place both batchwise in a separate reaction vessel and continuously, e.g. in a mixing nozzle. The continuous reaction in a mixing nozzle is preferred. Examples of mixing nozzles that can be used are smooth-jet nozzles, fan-spray nozzles, annular nozzles, ring-shaped nozzles, perforated nozzles or counter-jet nozzles. A mixing nozzle that works in a similar way to the pre-emulsifying in the jet disperser known from DE 195 10 651 A is preferably used.

The aqueous polyurethane dispersions produced by the process according to the invention have an average particle size of 25 to 600 nm, preferably of 30 to 300 nm, particularly preferably of 35 to 250 nm. The solids content of the polyurethane dispersions is in the range of 30 to 65 wt. %, preferably 35 to 60 wt. % and particularly preferably 37 to 50 wt. %.

The essential advantage of the process according to the invention lies in the continuous operation. For the process according to the invention, comprising steps a) and b), only one stirred vessel is required for the production of the NCO prepolymer. The chain lengthening can also be carried out batchwise in another vessel, but the chain lengthening is preferably carried out continuously so that a second stirred vessel is unnecessary. In a comparable batchwise process known from the prior art, consisting of the production of the polyurethane prepolymer and the subsequent production of the polyurethane dispersion, two stirred vessels are generally necessary (inverse process).

The process according to the invention is especially advantageous for polyurethane dispersions based on aromatic polyisocyanates. High solids contents of at least 35 wt. % are achieved, whereas with discontinuous processes known from the prior art, solids contents of no more than 30 wt. % are achieved.

Furthermore, no external emulsifier has to be used in the process according to the invention, but the process according to the invention also includes those dispersions produced and stabilised exclusively or partly by using external ionic and/or non-ionic emulsifiers from the prior art. Moreover, all known amines can be used as chain extenders. Thus, a broader range of dispersions based on aromatic polyisocyanates with widely differing properties is accessible.

It is also an advantage of the process according to the invention that, for the mixing of the components, e.g. of the polyurethane prepolymer with water, and for the homogenising of the pre-emulsion, mixing nozzles, preferably jet dispersers, are used, which have no moving parts. They are therefore less prone to breakdowns and require less maintenance.

Advantageously, the service life is higher in the process according to the invention compared with the processes known from the prior art. In the process according to the invention, it is in the order of magnitude of 10 hours, in which continuous, trouble-free operation is guaranteed.

The invention also provides substrates coated with a paint film using an aqueous polyurethane dispersion produced by the process according to the invention.

Examples of these substrates are wood, metal, plastic, paper, leather, textiles, felt, glass or substrates based on mineral components. The substrates can either be coated directly with a paint film based on an aqueous polyurethane dispersion produced by the process according to the invention or they can first be provided with one or more other coats of any type.

EXAMPLES

Production of an OH component A:

3200 g of castor oil and 1600 g of soybean oil, together with 2.4 g of dibutyltin oxide, were weighed into a 5-litre reactor with a reflux condenser. A nitrogen stream (5 l/h) was passed through the reactants. The temperature was increased to 240° C. within 140 min. After 4 h at 240° C., the mixture was cooled. The OH value was 109 mg KOH/g, the acid value 3.2 mg KOH/g.

Comparative Example 339 g polyTHF (MG 2000, BASF AG, Ludwigshafen, Germany), 248 g of the OH component A, 70 g dimethylolpropionic acid, 34 g 1,6-hexanediol and 179 g N-methylpyrrolidone were heated to 70° C. and stirred until a clear solution formed. 516 g Desmodur® W (Bayer AG, Leverkusen, Germany) were then added and the mixture was heated to 100° C. Stirring was carried out at this temperature until the NCO content of 4.6% was reached and then the mixture was cooled to 70° C. and 37 g triethylamine were added. 500 g of this solution were dispersed in 666 g of water, which had an initial temperature of 30° C., stirring vigorously.

After dispersing, stirring was continued for 5 min. A solution of 5.5 g of hydrazine hydrate and 8.8 g of ethylenediamine in 74 g water was then added within 5 min. To complete the reaction of the isocyanate groups, stirring was performed at 45° C. until no more NCO could be detected by IR spectroscopy. After cooling to 30° C., filtering was performed through a Seitz T5500 filter.

Characteristic data of the polyurethane dispersion according to the comparative example:

Average particle size: 58 nm (laser correlation spectroscopy, LCS)
pH: 7.8
Solids content: 36.0 wt. %

Example 1

NCO Prepolymer 1

339 g polyTHF (MG 2000, BASF AG, Ludwigshafen, Germany), 248 g of the OH component A, 70 g dimethylolpropionic acid, 34 g 1,6-hexanediol and 179 g N-methylpyrrolidone were heated to 70° C. and stirred until a clear solution formed. 516 g Desmodur® W (Bayer AG, Leverkusen, Germany) were then added and the mixture was heated to 100° C. Stirring was carried out at this temperature until an NCO content of 4.6% was reached. Finally, the mixture was cooled to 70° C. and 37 g triethylamine were added.

Figure 2:
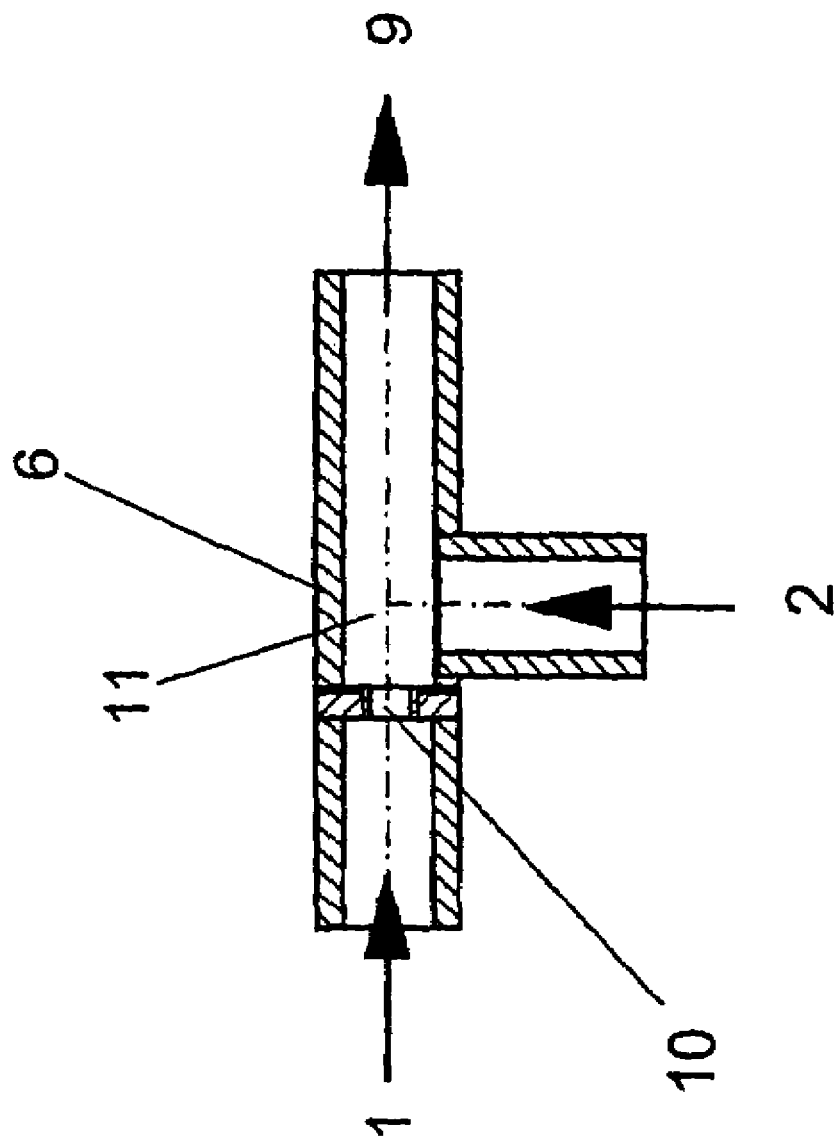
FIG. 2 shows a diagram of an embodiment of the mixing nozzle used for the production of a pre-emulsion.
Figure 3:
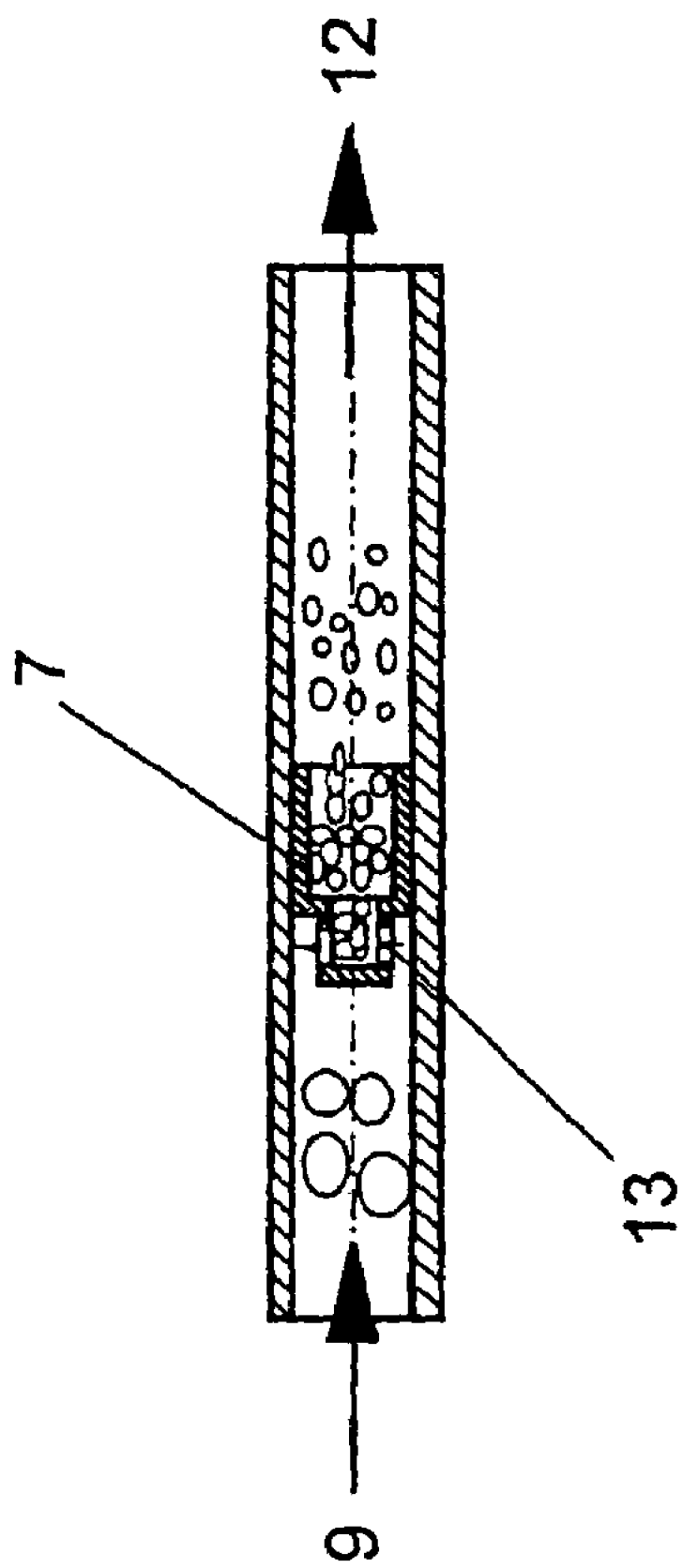
FIG. 3 shows a diagram of an embodiment of a homogenising nozzle used for homogenising a pre-emulsion.

The further processing of the prepolymer thus produced in the dispersing plant took place as illustrated in FIG. 1. By means of the gear pump 3, the prepolymer 1 was transported into the mixing nozzle 6 at a mass flow rate of 10 kg/h. Water 2 was transported at a mass flow rate of 9 kg/h by means of the piston diaphragm pump 4 via the heat exchanger 5 into the mixing nozzle 6, which possessed a bore 10 of 2 mm in diameter and a mixing zone 11 of 9 mm in diameter and 200 mm in length (cf. FIG. 2). The resulting predispersion 9 was homogenised by 6 jet dispersers 7, each of which had 2 bores 13 of 0.8 mm in diameter (cf. FIG. 3). The temperature of the prepolymer feed 1 was 84° C. The water temperature was adjusted to 80° C. with the heat exchanger 5 on starting up the plant and then reduced to the extent that a temperature of 46° C. resulted behind the jet dispersers 7 in the stationary state. The pressure drop over the jet dispersers 7 was 17 bar.

The dispersion 12 was cooled to 29° C. in the heat exchanger 8. After this, 176 g of a chain extender solution were added to 2330 g of the dispersion 12 in a glass vessel (not illustrated), stirring. The following was used as the solution of the chain extender: 11 g hydrazine hydrate and 17.6 g ethylenediamine in 149 g water. After cooling to 30° C., filtering was performed through a Seitz T5500 filter.

Characteristic data of the polyurethane dispersion according to example 1:

Average particle size: 50 nm (laser correlation spectroscopy, LCS)
pH: 8.0
Solids content: 38.6 wt. %

Example 2

NCO Prepolymer 2

A mixture of 2309.0 g Acclaim Polyol 2200 (molecular weight approx. 2000 g/mole, Bayer AG, Leverkusen, Germany), 276.4 g dimethylolpropionic acid and 154.7 g 1,6-hexanediol was dehydrated for one hour at 110° C. in vacuo. After breaking the vacuum with nitrogen, 1064 ml N-methylpyrrolidone were added and homogenisation was performed at 70° C. The polyol mixture was then cooled to ambient temperature and fed into a recipient vessel with 1043.0 g Desmodur® T 80 (Bayer AG, Leverkusen, Germany) within one hour. After adding all the polyol mixture, stirring was carried out at 60° C. until an NCO content of 2.5% (theoretical NCO content 2.5%) was reached (viscosity η=20.64 Pa•s (23° C.), D=40 s$^{-1}$).

Figure 4:
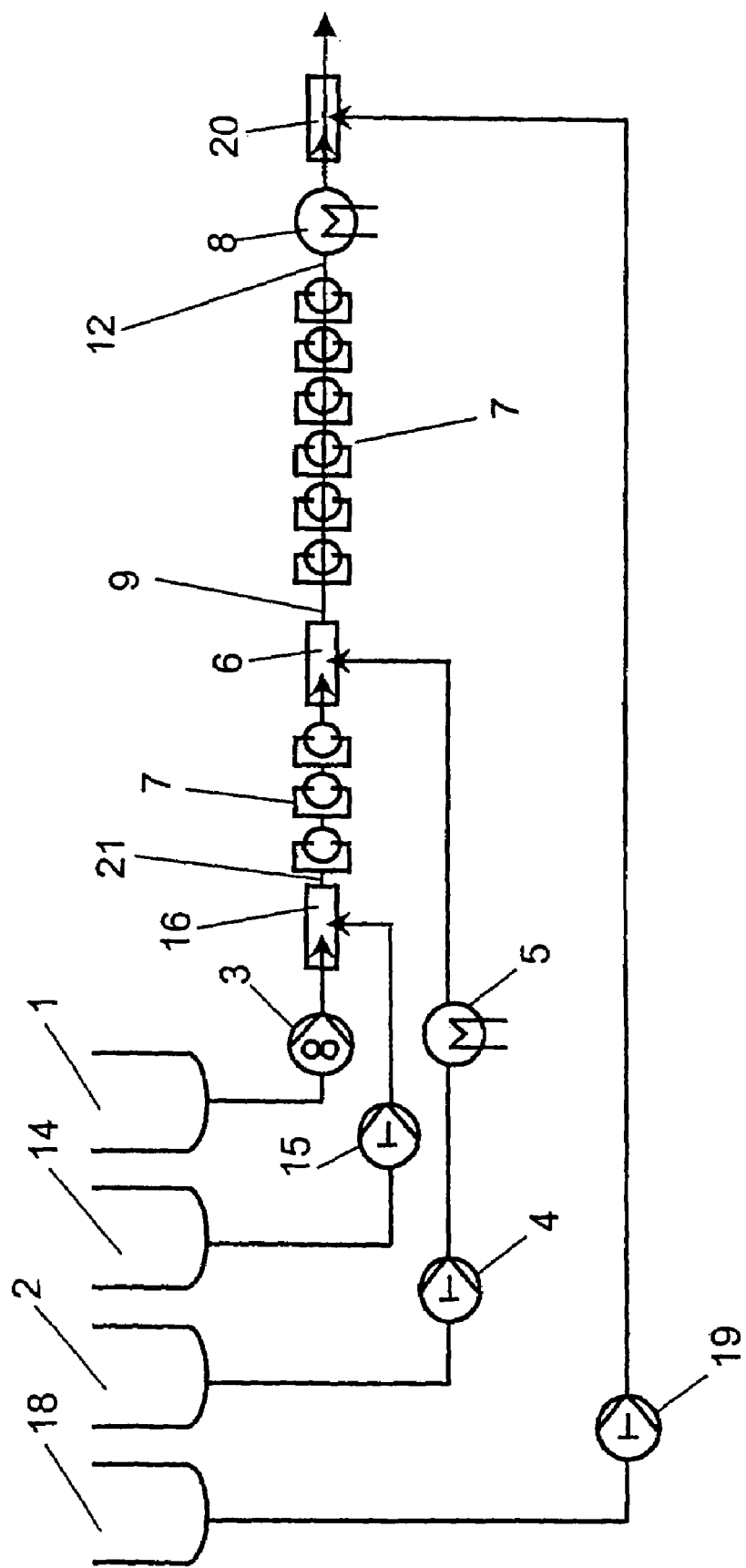
FIG. 4 shows a flow diagram of a process according to the invention for dispersing aromatic prepolymers with continuous chain lengthening.

The further processing of the prepolymer thus produced in the dispersing plant took place as illustrated in FIG. 4: The prepolymer 1 is transported into the mixing nozzle 16 at a mass flow rate of 12 kg/h by means of the gear pump 3.

Figure 5:
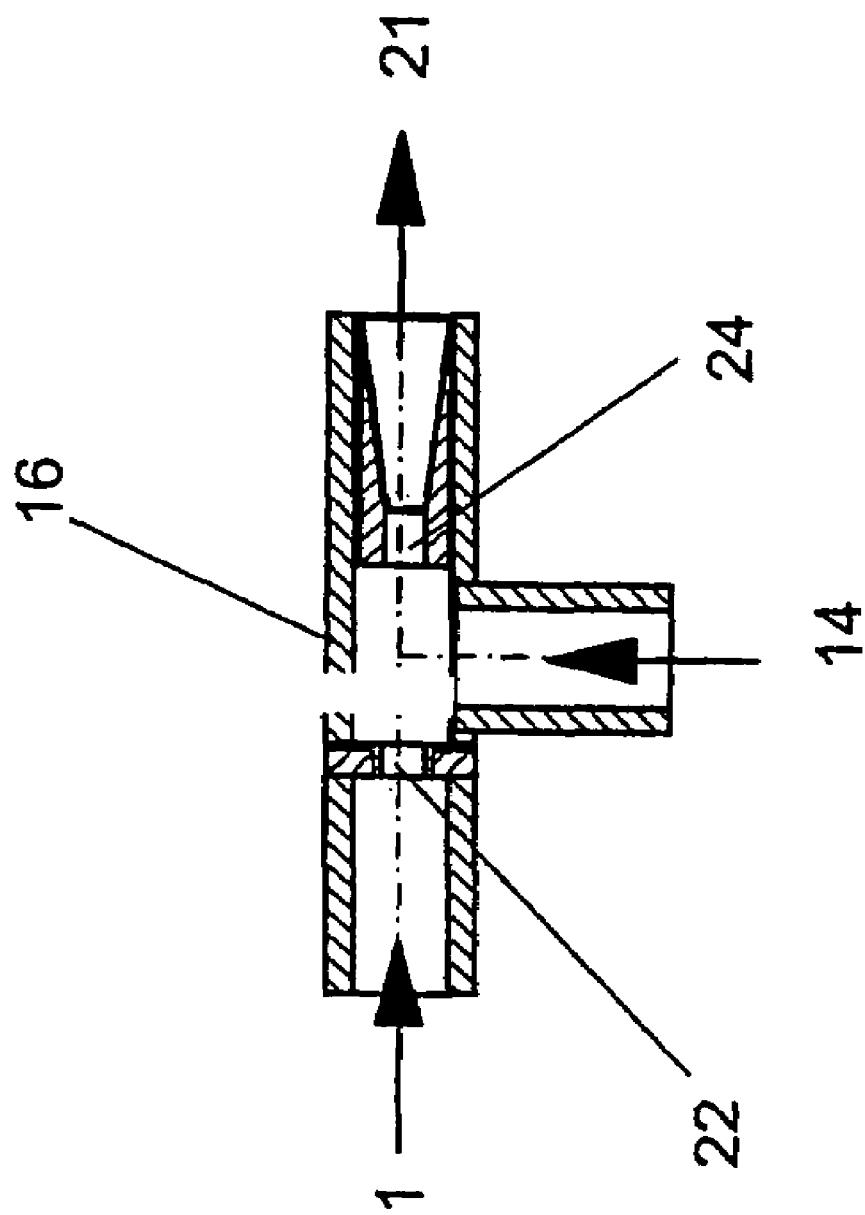
FIG. 5 shows a diagram of a further preferred embodiment of a mixing nozzle used to produce a pre-emulsion.

Neutralising amine solution 14, consisting of 440.6 parts triethylamine and 511 parts N-methylpyrrolidone, was transported by the piston pump 15 at a mass flow rate of 1.2 kg/h into the mixing nozzle 16, which possessed a bore 22 of 0.3 mm in diameter and a bore 24 of 4 mm in diameter (cf. FIG. 5). The mixture 21 was then fed through 3 jet dispersers 7, each of which had 4 bores 13 of 2.1 mm in diameter (as in FIG. 3). The mixture was then fed into the mixing nozzle 6. Water 2 was transported at a mass flow rate of 15 kg/h by means of the piston diaphragm pump 4 via the heat exchanger 5 into the mixing nozzle 6, which possessed a bore 10 of 2 mm in diameter and a mixing zone 11 of 9 mm in diameter and 200 mm in length (cf. FIG. 2). The resulting pre-emulsion 9 was homogenised by means of 6 jet dispersers 7, each of which had 4 bores 13 of 1.2 mm in diameter (cf. FIG. 3).

The temperature of the prepolymer feed 1 was 33° C. The water temperature was adjusted by the heat exchanger 5 so that a temperature of 37° C. resulted behind the jet dispersers 7 in the stationary state. The pressure drop over the jet dispersers 7 was 12 bar. The dispersion 12 was cooled to 23° C. in the heat exchanger 8 and fed to the mixing nozzle 20. A chain extender solution 18, consisting of 148.9 parts ethylenediamine and 1645.6 parts water, was fed by the piston pump 19 to the mixing nozzle 20 (cf. FIG. 2), which possessed a bore 10 of 0.3 mm in diameter and a mixing zone 11 of 9 mm in diameter and 100 mm in length.

Characteristic data of the polyurethane dispersion according to Example 2

Average particle size: 73 nm (laser correlation spectroscopy, LCS)
pH: 7.5
Solids content: 37%

Example 3

NCO Prepolymer 3

4643 g PE 225 B (adipic acid ester based on 1,6-hexanediol, OH value=47 mg KOH/g, Bayer AG, Leverkusen, Germany) and 580 g dimethylolpropionic acid were dehydrated at 110° C. for one hour in vacuo. 1292 g N-methylpyrrolidone were then added to the polyol mixture and stirred until a clear solution formed. The mixture was then cooled to 60° C., before 3938 g isophorone diisocyanate were added within 20 minutes. After the exothermic reaction had subsided, the mixture was slowly cooled to 70° C. and 744 g 1,6-hexanediol were rapidly added. Cooling took place in such a way that the reaction temperature did not exceed 100° C. After the NCO content of the resin mixture had reached 4.0%, a prepared solution of 311 g N-methylpyrrolidone and 358 g triethylamine was added and mixed homogeneously.

Figure 6:
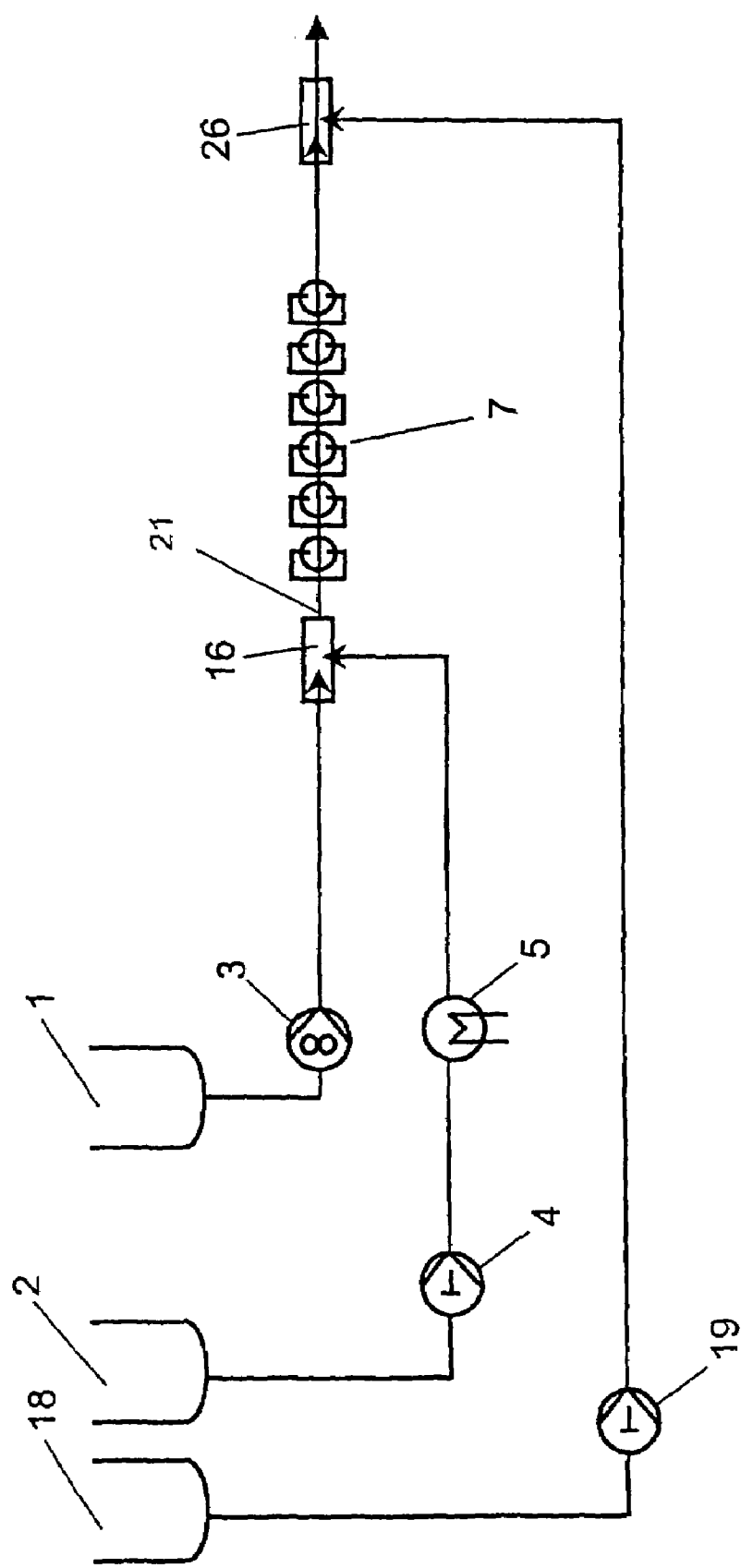
FIG. 6 shows a flow diagram of an embodiment of a process according to the invention for dispersing aliphatic prepolymers with continuous chain lengthening.

The further processing of the prepolymer thus produced in the dispersing plant took place as illustrated in FIG. 6: the prepolymer 1 was transported at a mass flow rate of 12 kg/h to the mixing nozzle 16 by means of the gear pump 3. Water 2 was transported at a mass flow rate of 12 kg/h by means of the piston diaphragm pump 4 via the heat exchanger 5 into the mixing nozzle 16, which possessed a bore 22 of 1.8 mm in diameter and a bore 24 of 2.2 mm in diameter (as in FIG. 5). The resulting predispersion 21 was homogenised by 6 jet dispersers 7, each of which had 4 bores of 1.2 mm in diameter (cf. FIG. 3). The temperature of the prepolymer feed 1 was 80° C. The water temperature was adjusted by the heat exchanger 5 to 80° C. on start-up of the plant and then reduced to the extent that a temperature of 55° C. resulted behind the jet dispersers 7 in the stationary state. The pressure drop over the jet dispersers 7 was 10 bar. The dispersion was fed to the mixing nozzle 26. A chain extender solution 18, consisting of 168 parts ethylenediamine and 1346 parts water, was fed by the piston pump 19 at a mass flow rate of 1.5 kg/h to the mixing nozzle 26 (as in FIG. 5), which possessed a bore 22 of 0.3 mm in diameter and a bore 24 of 2.2 mm in diameter. Behind the mixing nozzle 26, a counter-pressure of 6 bar was applied to the process by means of a diaphragm 0.6 mm in diameter.

Characteristic data of the polyurethane dispersion according to Example 3

Average particle size: 54 nm (laser correlation spectroscopy, LCS)
pH: 7.2
Solids content: 40%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A process for the continuous production of an aqueous polyurethane dispersion based on at least one aliphatic and/or aromatic polyisocyanate, comprising the steps of:
   a) producing an aqueous pre-emulsion by mixing a polyurethane prepolymer containing hydrophilic and/or potentially hydrophilic groups with water in a mixing nozzle, wherein the polyurethane prepolymer is injected into the water; and
   b) forming an emulsion by homogenizing the pre-emulsion from step a) in a multi-step homogenizing nozzle comprising between 2 and 20 nozzles and/or dispersers.

2. The process according to claim 1 further comprising step c), at least a partially reacting the emulsion containing free NCO groups from step b) with at least one amine that is reactive towards isocyanate groups.

3. The process according to claim 2, wherein the reaction with an amine according to step c) takes place continuously in a mixing nozzle.

4. The process according to claim 1, wherein the production of the pre-emulsion according to step a) takes place with a pressure difference of 0.1 to 100 bar.

5. The process according to claim 1, wherein the formation of the emulsion according to step b) takes place with a pressure difference of 1 to 200 bar.

6. The process according to claim 1, wherein 2 to 20 steps are used for the homogenizing according to step b).

7. The process according to claim 1, wherein a jet disperser is used as the homogenizing nozzle in step b).

8. The process according to claim 1, wherein a jet disperser is used as the mixing nozzle in step a).

9. The process according to claim 1, wherein the temperature of the polyurethane prepolymer in step a) is 10° C. to 100° C.

10. The process according to claim 1, wherein the temperature of the water in step a) is 5° C. to 95° C.

11. The process according to claim 1, wherein the formation of the emulsion according to step b) takes place with a pressure difference of 3 to 100 bar.

12. The process according to claim 1, wherein the formation of the emulsion according to step b) takes place with a pressure difference of 5 to 60 bar.

13. The process according to claim 1, wherein the production of the pre-emulsion according to step a) takes place with a pressure difference of 0.2 to 50 bar.

14. The process according to claim 1, wherein the production of the pre-emulsion according to step a) takes place with a pressure difference of 0.5 to 20 bar.

15. The process according to claim 2, wherein jet dispersers are used in the homogenizing nozzle in step b).

16. The process according to claim 3, wherein jet dispersers are used in the homogenizing nozzle in step b).

17. The process according to claim 2, wherein the temperature of the polyurethane prepolymer in step a) is 10° C. to 100° C. and the temperature of the water in step a) is 5° C. to 95° C.

18. The process according to claim 3, wherein the temperature of the polyurethane prepolymer in step a) is 10° C. to 100° C. and the temperature of the water in step a) is 5° C. to 95° C.

* * * * *